United States Patent
Böhler et al.

(10) Patent No.: US 12,500,494 B2
(45) Date of Patent: Dec. 16, 2025

(54) METHOD FOR HARDENING A BRIDGE ASSEMBLY OF A ROTATIONAL BODY

(71) Applicant: Schaeffler Technologies AG & Co. KG, Herzogenaurach (DE)

(72) Inventors: Felix Böhler, Brugg AG (CH); Holger Keck, Rheinau (DE); Cédric Blaes, Munchhausen (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 964 days.

(21) Appl. No.: 17/637,524

(22) PCT Filed: Jul. 31, 2020

(86) PCT No.: PCT/DE2020/100683
§ 371 (c)(1),
(2) Date: Feb. 23, 2022

(87) PCT Pub. No.: WO2021/037304
PCT Pub. Date: Mar. 4, 2021

(65) Prior Publication Data
US 2022/0286031 A1    Sep. 8, 2022

(30) Foreign Application Priority Data

Aug. 30, 2019   (DE) .......................... 102019123259.7

(51) Int. Cl.
*H02K 15/165*   (2025.01)
*H02K 1/276*    (2022.01)
(Continued)

(52) U.S. Cl.
CPC ......... *H02K 15/165* (2013.01); *H02K 1/2766* (2013.01); *H02K 7/04* (2013.01); *H02K 15/03* (2013.01); *H02K 2213/03* (2013.01)

(58) Field of Classification Search
CPC .... H02K 1/276; H02K 1/2766; H02K 15/035; H02K 15/165
See application file for complete search history.

(56) References Cited

U.S. PATENT DOCUMENTS 3,797,106 A   3/1974   Costello
5,158,435 A   10/1992  Eardley
(Continued)

FOREIGN PATENT DOCUMENTS

CN   102168646 B   4/2014
CN   105978266 B   12/2018
(Continued)

*Primary Examiner* — Livius R. Cazan
(74) *Attorney, Agent, or Firm* — Volpe Koenig (57) ABSTRACT

A for hardening a bridge assembly of a rotational body having an axis of rotation for an electrical drive, including the steps for balancing and rotational hardening of, rotating the rotational body about an axis of rotation at an imbalance determination rotational speed to detect an imbalance of the rotational body, determining the imbalance of the rotational body, fastening at least one balancing weight to or removing at least one balancing weight from the rotational body at a standstill rotational speed to compensate the imbalance, the hardening including rotating the rotational body about the axis of rotation at a hardening rotational speed, the magnitude of the hardening rotational speed being greater than the magnitude of the imbalance determination rotational speed.

13 Claims, 2 Drawing Sheets

(51) Int. Cl.
*H02K 7/04* (2006.01)
*H02K 15/03* (2025.01)

(56) References Cited

U.S. PATENT DOCUMENTS

| | | | |
|---|---|---|---|
| 6,580,186 | B1 | 6/2003 | Suzuki et al. |
| 2003/0201685 | A1* | 10/2003 | Shimada .............. H02K 15/03 |
| | | | 310/156.53 |
| 2010/0212422 | A1 | 8/2010 | Allen et al. |
| 2018/0254675 | A1 | 9/2018 | Degner et al. |

FOREIGN PATENT DOCUMENTS

| | | | | |
|---|---|---|---|---|
| CN | 104704336 | B | 1/2019 | |
| CN | 103712747 | B | 7/2019 | |
| EP | 3048702 | | 7/2016 | |
| EP | 3179611 | | 6/2017 | |
| EP | 3179611 | A1 * | 6/2017 | ......... F16C 32/0446 |
| JP | 2000060087 | | 2/2000 | |

* cited by examiner

METHOD FOR HARDENING A BRIDGE ASSEMBLY OF A ROTATIONAL BODY

CROSS-REFERENCE TO RELATED APPLICATIONS

This application is the U.S. National Phase of PCT Appln. No. PCT/DE2020/100683, filed Jul. 31, 2020, which claims priority from German Patent Application No. 10 2019 123 259.7, filed Aug. 30, 2019, the entire disclosures of which are incorporated by reference herein.

TECHNICAL FIELD

The present disclosure relates to a method for hardening a bridge assembly of a rotational body having an axis of rotation for an electric drive.

The present disclosure also relates to a rotational body produced by the steps of the method.

BACKGROUND

With the increasing electrification of vehicles, in particular, it is becoming more important to continuously improve electric drive systems. This also means increasing their efficiency, for example by saving weight. It is also important to reduce the installation space required without sacrificing performance.

It is to be expected that electrified vehicles will reach high numbers in the next few years and that the degree of mechatronic integration will increase significantly. Very different topologies are implemented for the drive train, which can be classified based on the installation position. For the constructive implementation of these drive trains, four aggregate classes are particularly significant, namely hybrid modules for integration into the internal combustion engine drive train, dedicated hybrid transmissions for the targeted implementation of hybrid and electric driving modes, electric axle drives for dedicated hybrid drive trains and purely electric vehicles and wheel hub drives for new mobility concepts. In principle, the use of electric machines is provided that, in particular, have a rotor based on rotor lamination.

What all future aggregate concepts have in common is that they have a high degree of integration of mechanics and electrics/electronics. However, the requirements for the electric machines differ. The axial installation space is limited both with hybrid modules and with wheel hub motors. In addition, there is a direct coupling of the speed to the drive train so that the power is scaled in particular via the torque of the electric machine. With electric axle drives, more axial installation space is available, but the diameter is usually limited due to the installation position. The coupling to the axis is preferably carried out via at least one gear stage in order to ensure the required starting torque. This makes it possible to increase the performance of the electric machines via higher speeds, which in turn enables smaller, material-saving designs. The same applies to most dedicated hybrid transmissions. In contrast, the power electronics are largely independent of the unit type; they are essentially defined by the voltage level, the amount of current required for the maximum output and the installation space specific to the unit.

SUMMARY

The object of the present disclosure is to create a method for hardening a bridge assembly of a rotational body having an axis of rotation for an electric drive, as well as a correspondingly produced rotational body, which enables an improved rotational body.

The object is achieved according by a method for hardening a bridge assembly of a rotational body having an axis of rotation for an electric drive with one or more of the features disclosed herein and by a rotational body with one or more of the features disclosed herein. Preferred embodiments are specified in the claims and the following description, each of which can either individually or in combination represent an aspect of the disclosure.

According to the disclosure, a method for hardening a bridge assembly of a rotational body having an axis of rotation for an electric drive is thus specified, at least having steps for balancing and rotational hardening, wherein the balancing has at least the following steps:

rotating the rotational body about an axis of rotation at an imbalance determination rotational speed in order to detect an imbalance of the rotational body, determining the imbalance of the rotational body, fastening at least one balancing weight to or removing at least one balancing weight from the rotational body at a standstill rotational speed in order to compensate the imbalance, wherein the rotational hardening has at least the following step:

rotating the rotational body about the axis of rotation at a hardening rotational speed, wherein the magnitude of the hardening rotational speed is greater than the magnitude of the imbalance determination rotational speed.

The method thus comprises two essential steps, namely balancing and rotational hardening. The individual steps of balancing can in particular be combined in their order with the individual steps of rotational hardening or can be carried out differently. It is essential that at some point in time each of these steps is carried out on a rotational body so that it has a hardened bridge assembly.

As a result of the rotational hardening, one or more bridge assemblies for reliable operation of the rotational body can have a smaller material thickness in the radial extension than would be the case without the rotational hardening. In other words, one or more bridge assemblies of the rotational body can be made radially thinner. The rotational hardening increases the strength of the rotational body in the area of the one or more bridge assemblies so that these have a higher bursting rotational speed and are therefore suitable for a higher operating rotational speed.

The term balancing refers to reducing or eliminating an imbalance. Every rigid body rotating about a fixed axis has an imbalance that can lead to vibrations or oscillations, noises and increased wear and tear, and even destruction at high speeds.

When balancing vehicle wheels, a balancing machine sets a body in rotation. The axis on which this happens is in particular equipped with sensors. Evaluation electronics calculate the imbalance from the measured values of the forces occurring on the axis. Then balance weights are fastened to the rim to compensate for the imbalance. The preferred aim of balancing is, on the one hand, to set the center of gravity of the wheel to be balanced so that it falls on the axis of rotation, and, on the other hand, so that the main axis of inertia perpendicular to the rotational body not only intersects with the axis of rotation, but lies thereon. Therefore, counterweights can optionally be attached to both sides of the rim.

Balancing machines determine the mass, the angle and the side of the rotational body on which the balancing weights or counterweights are to be attached using a rotary movement and a dynamic force measurement on the axis of rotation.

The fastening or removal of a balance weight on or from the rotational body is ultimately a process step that is subject to a common technical consideration, in which the mass distribution is adjusted in such a way that the imbalance is compensated. This terminology can be summarized specifically as balancing.

Rotational hardening increases the strength of one or more bridge assemblies. The strength of a material describes the ability to withstand mechanical loads before failure occurs, and is specified as mechanical stress, i.e., the force per cross-sectional area. Materials with high strength can be subjected to higher stresses than materials with low strength. The failure can be an impermissible deformation, in particular a plastic, i.e., permanent deformation or a break. In the case of rotational bodies within the meaning of the disclosure, the bursting rotational speed is the point of such a break. In the present case, the application of the hardening rotational speed to the rotational body results in an increase in the material strength. This can preferably be done by means of an offset in the respective material, which is caused by the action of centrifugal force.

The rotational hardening is preferably not carried out in an environment-specific manner, as the duration of exposure to the hardening rotational speed, the ambient temperature and/or the ambient pressure are not significant influences. For example, the application of the hardening rotational speed to the rotational body for one second can be sufficient to solidify the rotational body.

A rotational standstill is to be understood as a standstill rotational speed in the context of the disclosure. In other words, the standstill rotational speed is zero.

According to the disclosure, a rotational body is also specified, produced by the steps of the method.

According to a preferred embodiment, it is provided that the rotational body is a rotor lamination, a rotor lamination stack, a rotor or an electric machine. In the case of a rotor lamination, a rotor lamination stack or a rotor, these are themselves rotating elements. In the case of an electric machine, it is not the entire machine that rotates, but its rotor, so that the electric machine according to the teaching of the disclosure is also considered to be a rotational body.

A rotor lamination is also known as an electrical steel lamination. It is an important soft magnetic material element for magnetic cores. According to its properties, it is divided into non-grain-oriented and grain-oriented materials, the former also being called dynamo sheet or motor sheet depending on the intended use, the latter also being called transformer sheet or core sheet. In a narrower sense, rotor lamination and rotor strip often refers to a cold-rolled strip made of iron-silicon alloys, and also to the lamination lamellae cut or punched therefrom, which are used to produce magnetic circuits for electrical machines, i.e., iron cores for dynamos, electric motors, transformers, relays, contactors, reactors, ignition coils, electricity meters and controllable deflection magnets.

The magnetic, physical and other requirements for the material are described in the standards "Cold-rolled, non-grain-oriented electrical steel sheet and strip in the final annealed state" (EN 10106) and "Grain-oriented electrical steel sheet and strip in the final annealed state" (EN 10107). The applicable point in time for the standards is the earliest priority date of this disclosure.

Rotor laminations as iron cores made of solid material are difficult to use in machines and transformers, because eddy currents arise under the influence of variable magnetic fields. Instead of transmitting electrical power, the core regularly becomes hot due to eddy currents with increasing frequency. In order to avoid this, iron cores for electric machines are preferably designed exclusively as laminated and insulated laminations in packs or as wound cut strip cores. A corresponding design is also referred to as laminated.

Soft magnetic materials form a magnet under the influence of a magnetic field and, when the field is switched off, largely return to the non-magnetic state. A simple dynamo lamination can usually be used magnetically with a maximum of 1.2 Tesla, corresponding to 12,000 Gauss. Advanced iron-silicon alloys enable flux densities of up to around 1.75 Tesla.

Rotor laminations or standard cores are preferably made from stamped individual laminations.

If several rotor laminations are arranged one above the other, this arrangement is known as a rotor laminate stack.

Rotor laminations can be insulated with paper layers glued on one side. The rotor laminations can preferably be insulated by chemically applied phosphating layers. The lamination thickness for normal applications is preferably 0.5 mm. For electrical transmitters of higher frequencies or particularly low-loss devices, thinner lamination with a thickness of 0.35 mm can be used. Cut tape and toroidal cores are often wound from even thinner and also insulated strips.

A rotor is a rotating part of an electric machine or an assembly. In particular, a rotor is used when there is also a stator. In the case of rotating electric machines, the entire rotating part of the machine is referred to as a rotor, such as the squirrel-cage rotor.

An electric machine is a machine used in electrical energy technology and represents a form of energy converter. A distinction is made between rotating electric machines, including various types of electric motors and electrical generators, and stationary electric machines, which include transformers. What all electric machines have in common is that they have a magnetic circuit in the structure thereof, which is essential for the function thereof. In the context of the disclosure, a rotating electric machine is a rotational body.

According to a preferred embodiment, it is provided that at least one bridge assembly is arranged on the outer circumference of at least one rotor lamination. Such bridge assemblies are provided at this position, in particular for the efficient functioning of electric machines.

According to a preferred embodiment, it is provided that the hardening rotational speed is set such that at least one bridge assembly of the rotational body has a plastic strain value of at least 0.2 percent up to and including 1 percent, preferably 0.5 percent, after rotational hardening. The plastic strain value is an indication of the permanent relative change in length, i.e., lengthening or shortening, of a body under load, for example due to a force or due to a change in temperature, in particular thermal expansion. If the size of the body increases, this is positive strain, so-called stretching, otherwise it is a negative strain, so-called compression. It has been found that at this level an advantageous hardening of the rotational body occurs, which enables the bridge assembly to be dimensioned compactly.

According to a preferred embodiment, it is provided that the hardening rotational speed is between the operating rotational speed of the rotational body and at least including less than 10 percent, preferably at least including less than 20 percent, of a bursting rotational speed of the rotational body. It has been found that with such a setting of the hardening rotational speed, an advantageous hardening of the rotational body occurs, which enables compact dimensioning of the bridge assembly.

According to a preferred embodiment, it is provided to further rotate the rotational body about the axis of rotation at the imbalance determination rotational speed, after the at least one balancing weight has been attached to or removed from the rotational body, in order to detect an imbalance in the rotational body, and preferably repeating the balancing if necessary. This is a quality assurance measure to produce a reliably balanced rotational body. In particular because of the additional stress of rotational hardening, this can be a sensible measure for quality assurance.

According to a preferred embodiment, the following sequence of steps is provided, namely at the outset, rotating the rotational body about the axis of rotation at the hardening rotational speed, wherein the magnitude of the hardening rotational speed is greater than the magnitude of the imbalance determination rotational speed, then rotating the rotational body about its axis of rotation at the imbalance determination rotational speed in order to detect the imbalance of the rotational body, optionally between rotating the rotational body about the axis of rotation at the hardening rotational speed and rotating the rotational body about its axis of rotation at the imbalance determination rotational speed, the rotational body is stationary at the standstill rotational speed, then determining the imbalance of the rotational body, then fastening at least one balancing weight to or removing at least one balancing weight from the rotational body at the standstill rotational speed in order to compensate the imbalance, preferably then further rotating of the rotational body about the axis of rotation at the imbalance determination rotational speed, after the at least one balancing weight has been attached to or removed from the rotational body, in order to detect an imbalance in the rotational body, and preferably repeating the balancing if necessary. A particular advantage of rotating the rotational body again is that any disturbance can be compensated for by the rotational hardening. If the rotational body does not stand still at the standstill rotational speed between the rotation of the rotational body about the axis of rotation at the hardening rotational speed and the rotation of the rotational body about its axis of rotation at the imbalance determination rotational speed, the balancing of the rotational body can take place immediately after its rotational hardening, so that the rotational body does not stand still and existing kinetic rotational energy is not dissipated, so that energy can be saved as a result. If the rotational body stands still at the standstill rotational speed between the rotation of the rotational body about the axis of rotation at the hardening rotational speed and the rotation of the rotational body about its axis of rotation at the imbalance determination rotational speed, the rotational body is stopped from its rotational movement after the rotational hardening, i.e., to the standstill rotational speed, which always corresponds to zero. Thereafter, the rotational body can be checked, for example, to ensure that it is free from defects. The rotational body can be balanced at any later point in time. Thus, for example, it can be prevented that a defective rotational body is rotated about its axis of rotation at an imbalance determination rotational speed, so that the processing of defective components is avoided in this way.

According to a preferred embodiment, the following sequence of steps is provided, namely at the outset rotating the rotational body about its axis of rotation at the imbalance determination rotational speed in order to detect the imbalance of the rotational body, then determining the imbalance of the rotational body, then fastening at least one balancing weight to or removing at least one balancing weight from the rotational body at the standstill rotational speed in order to compensate the imbalance, then rotating the rotational body about the axis of rotation at the hardening rotational speed, wherein the magnitude of the hardening rotational speed is greater than the magnitude of the imbalance determination rotational speed, preferably then further rotating of the rotational body about the axis of rotation at the imbalance determination rotational speed, after the at least one balancing weight has been attached to or removed from the rotational body, in order to detect an imbalance in the rotational body, and preferably repeating the balancing if necessary. A particular advantage of rotating the rotational body again is that any disturbance can be compensated for by the rotational hardening. Furthermore, the rotational body can be rotated again about the axis of rotation with the imbalance determination rotational speed immediately after its rotational hardening, so that the rotational body does not stand still and existing kinetic rotational energy is not dissipated, so that energy can be saved as a result.

According to a preferred embodiment, the following sequence of steps is provided, namely at the outset rotating the rotational body about its axis of rotation at the imbalance determination rotational speed in order to detect the imbalance of the rotational body, then determining the imbalance of the rotational body, then fastening at least one balancing weight to or removing at least one balancing weight from the rotational body at the standstill rotational speed in order to compensate the imbalance, preferably then further rotating of the rotational body about the axis of rotation at the imbalance determination rotational speed, after the at least one balancing weight has been attached to or removed from the rotational body, in order to detect an imbalance in the rotational body, and preferably repeating the balancing if necessary, then rotating the rotational body about the axis of rotation at the hardening rotational speed, preferably in the context of the final assembly of the rotational body, wherein the magnitude of the hardening rotational speed is greater than the magnitude of the imbalance determination rotational speed. A particular advantage of rotating the rotational body again is that any disturbance can be compensated for by the rotational hardening. According to this embodiment, a particular advantage is that the rotational hardening can also take place as the last method step in a different production process, for example as part of a final assembly with the vehicle manufacturer. This means that they can carry out the rotational hardening according to their own requirements.

BRIEF DESCRIPTION OF THE DRAWINGS

In the following, the disclosure is explained by way of example with reference to the accompanying drawings using preferred exemplary embodiments, wherein the features shown below can represent an aspect of the disclosure both individually and in combination. In the figures.

DETAILED DESCRIPTION

FIGS. 5 to 8 each show preferred measures of a method for hardening a bridge assembly 10 of a rotational body 12 having an axis of rotation R for an electric drive.

Figure 1:
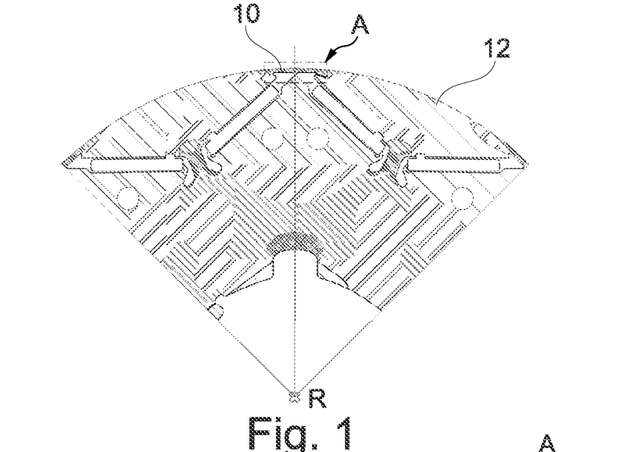
FIG. 1: shows a partial representation of a rotational body having at least one bridge assembly, in particular hardened according to a preferred measure of the disclosure.

FIG. 1 shows part of a rotor lamination as a rotational body 12, produced by the steps of the method. Here, FIG. 1 comprises a section A of a bridge assembly 10 of a rotational body 12 designed as a rotor lamination.

Figure 2:
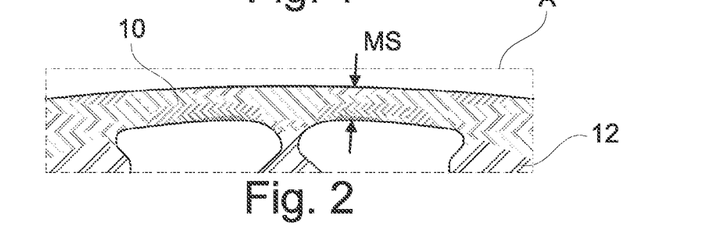
FIG. 2: shows a section of the at least one bridge assembly according to FIG. 1, but without any rotational hardening.

FIG. 2 shows an enlarged section of a bridge assembly 10 of a rotational body 12 designed as a rotor lamination, analogous to section A of FIG. 1. However, this rotor lamination is manufactured according to the prior art.

Figure 3:
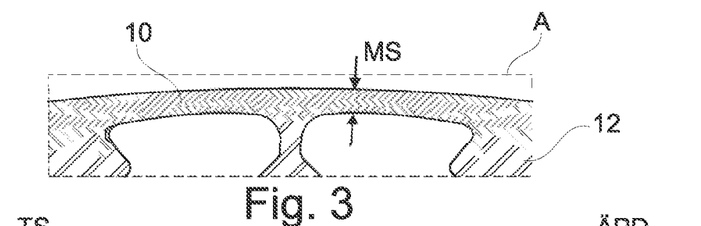
FIG. 3: shows a section of the at least one bridge assembly according to FIG. 1, but with rotational hardening having taken place.

FIG. 3 shows the bridge assembly 10 of the rotational body 12 designed as a rotor lamination, as section A from FIG. 1. The bridge assembly 10 of the rotational body 12 designed as a rotor lamination was thus rotationally hardened.

A comparison of the bridge assemblies 10 of FIGS. 2 and 3 symbolically show that the bridge assembly 10 according to FIG. 2 has a higher material thickness than the bridge assembly 10 according to FIG. 3. Both bridge assemblies 10 have the same operational strength. I.e., they have a similar operating rotational speed B and bursting rotational speed BD. This is due to the fact that the bridge assembly 10 according to FIG. 2 is not hardened, unlike the bridge assembly 10 according to FIG. 3.

The material thickness MS in the bridge assembly 10 according to FIG. 2 is 0.9 mm, for example. In contrast, the material thickness MS in the bridge assembly 10 according to FIG. 3 is 0.6 mm, for example. The material thickness MS in the case of the bridge assembly 10 according to FIG. 3 can preferably fluctuate between 0.5 mm and 0.8 mm, inclusive. In particular, according to the teaching of the invention, not only are these values protectable in operating practice because of their particular reliability of the rotational body 12, but also the relationships or dimensions of these amounts to one another, which can each be derived by simple calculation rules.

A bridge assembly 10 according to FIG. 3, i.e., with a material thickness MS of 0.6 mm without rotational hardening, would lead to premature failure or bursting of the rotational body 12 when an operating rotational speed B is reached. Only the rotational hardening enables the operation of a more slender rotational body 12 at previously known rotational speeds D.

Figure 4:
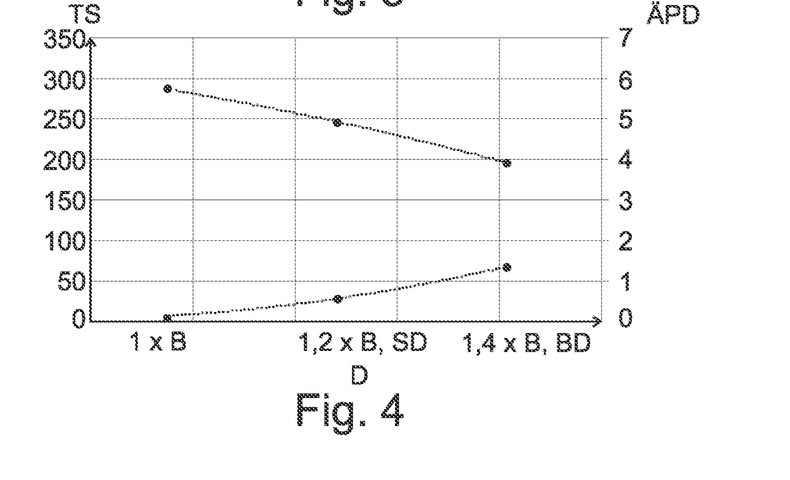
FIG. 4: shows a diagram of the increased service life of the rotational body according to FIG. 3, FIG. 5: shows a diagram of a preferred production method for the rotational body according to FIG. 3, FIG. 6: shows a diagram of an alternative preferred production method of the rotational body according to FIG. 3, FIG. 7: shows a diagram of an alternative preferred production method for the rotational body according to FIG. 3, and FIG. 8: shows a diagram of an alternative preferred production method of the rotational body according to FIG. 3.

The extended service life of the rotational body 12 according to FIG. 3 is shown in FIG. 4. FIG. 4 shows a diagram with a horizontal axis which represents the rotational speed D and two vertical axes. The left vertical axis shows the transformed stress amplitude TS. The right vertical axis shows the equivalent plastic strain APD. FIG. 4 shows two lines. The upper line relates to the transformed stress amplitude TS. The lower line relates to the equivalent plastic strain APD. Both lines each comprise three specific rotational speeds D, wherein these are the same for both lines. The specific rotational speeds D are shown with dots.

In FIG. 4, the point on the left can represent the operating rotational speed B, for example. I.e., the rotational speed of the rotor body 12 in its daily practical operation. The next point can be a so-called spin rotational speed SD. This is usually 1.2 times the operating rotational speed B. Usually, the rotational body 12 or its rotating components should be designed in such a way that there is no macroscopic change at the spin rotational speed SD. The third point can be the bursting rotational speed BD, for example. This is usually 1.4 times the operating rotational speed B. At least up to the bursting rotational speed BD, an electric machine should usually be able to withstand the loads.

Thus, FIG. 4 shows the influence of the hardening rotational speed V on the transformed stress amplitude TS and the equivalent plastic strain ÄPD in the critical bridge assembly 10 of a rotational body 12 designed as a rotor sheet with a constant material thickness MS of 0.6 mm. With increasing plastic strain, the permissible equivalent transformed stress amplitude increases. Ultimately, this means an extended service life of the rotor body 12.

As mentioned above, FIGS. 5 to 8 each disclose preferred measures of a method for hardening a bridge assembly 10 of a rotational body 12 having an axis of rotation R for an electric drive.

The individual steps are shown symbolically in the method stages VS.

In principle, the method according to FIGS. 5 to 8 comprises at least steps of balancing and rotational hardening, wherein the balancing has at least the following steps:
rotating the rotational body 12 about an axis of rotation R at an imbalance determination rotational speed U 110 in order to detect an imbalance of the rotational body 12,
determining the imbalance of the rotational body 12 120,
fastening at least one balancing weight to or removing at least one balancing weight from the rotational body 12 at a standstill rotational speed S 130 in order to compensate the imbalance,
wherein the rotational hardening has at least the following step:
rotating the rotational body 12 about the axis of rotation R at a hardening rotational speed V 210, wherein the magnitude of the hardening rotational speed V is greater than the magnitude of the imbalance determination rotational speed U.

Essentially, it is provided that the rotational body 12 is a rotor lamination, a rotor lamination stack, a rotor or an electric machine. A rotor lamination is shown, by way of example, in FIG. 1. It is provided in particular that at least one bridge assembly 10 is arranged on the outer circumference of at least one rotor lamination.

It is schematically indicated between FIGS. 2 and 3 that the hardening rotational speed V is set in such a way that at least one bridge assembly 10 of the rotational body 12 has a strain value of 0.5 percent, for example, after the rotational hardening.

According to a preferred embodiment, it is provided that the hardening rotational speed V is between the operating rotational speed B of the rotational body 12 and at least including less than 10 percent, preferably at least including less than 20 percent, of a bursting rotational speed BD of the rotational body 12.

Preferably, it can be provided that there is further rotating of the rotational body 12 about the axis of rotation R at the imbalance determination rotational speed U 140, after the at least one balancing weight has been attached to or removed from the rotational body 12 130, in order to detect an imbalance in the rotational body 12, and preferably repeating the balancing if necessary.

Figure 5:
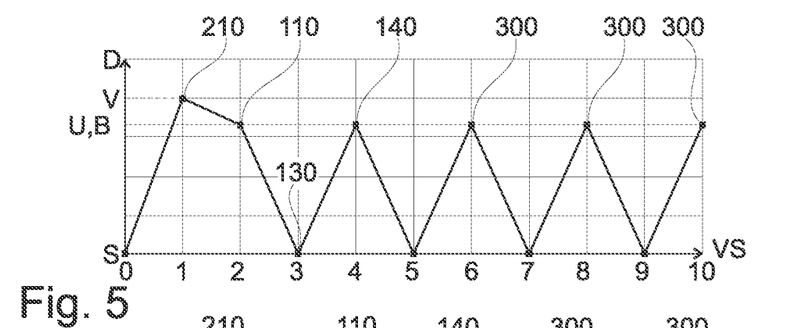

According to FIG. 5, a preferred sequence of method steps can be designed as follows: at the outset rotating the rotational body 12 about the axis of rotation R at the hardening rotational speed V 210, wherein the magnitude of the hardening rotational speed V is greater than the magnitude of the imbalance determination rotational speed U, then rotating the rotational body 12 about its axis of rotation R at the imbalance determination rotational speed U 110 in order to detect an imbalance of the rotational body 12, then determining the imbalance of the rotational body 12 120, then fastening at least one balancing weight to or removing at least one balancing weight from the rotational body 12 at the standstill rotational speed S 130 in order to compensate the imbalance, preferably then further rotating of the rotational body 12 about the axis of rotation R at the imbalance determination rotational speed U 140, after the at least one balancing weight has been attached to or removed from the rotational body 12 130, in order to detect an imbalance in the rotational body 12, and preferably repeating the balancing if necessary.

Figure 6:
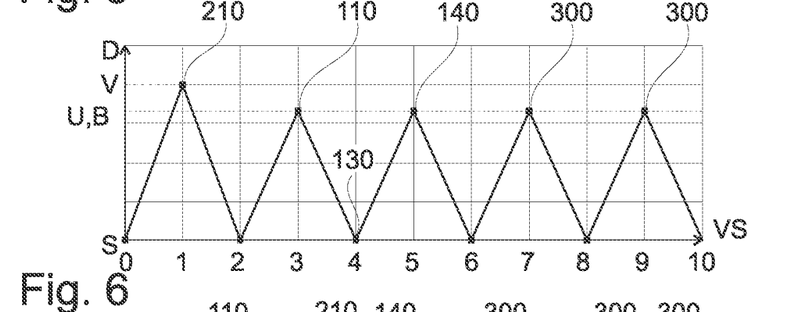

According to FIG. 6, a preferred sequence of method steps can be designed as follows: at the outset rotating the rotational body 12 about the axis of rotation R at the hardening rotational speed V 210, wherein the magnitude of the hardening rotational speed V is greater than the magnitude of the imbalance determination rotational speed U, then rotating the rotational body 12 about its axis of rotation R at the imbalance determination rotational speed U 110 in order to detect an imbalance of the rotational body 12, wherein between the rotation of the rotational body 12 about the axis of rotation R at the hardening rotational speed V 210 and the rotation of the rotational body 12 about its axis of rotation R at the imbalance determination rotational speed U 110, the rotational body 12 is stationary at the standstill rotational speed S, then determining the imbalance of the rotational body 12 120, then fastening at least one balancing weight to or removing at least one balancing weight from the rotational body 12 at the standstill rotational speed S 130 in order to compensate the imbalance, preferably then further rotating of the rotational body 12 about the axis of rotation R at the imbalance determination rotational speed U 140, after the at least one balancing weight has been attached to or removed from the rotational body 12 130, in order to detect an imbalance in the rotational body 12, and preferably repeating the balancing if necessary.

Figure 7:
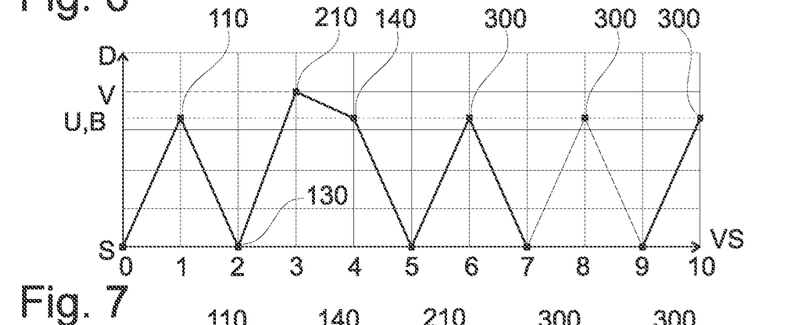

According to FIG. 7, an alternative preferred sequence of method steps can be designed as follows: at the outset, rotating the rotational body 12 about its axis of rotation Rat the imbalance determination rotational speed U 110 in order to detect an imbalance of the rotational body 12, then determining the imbalance of the rotational body 12 120, then fastening at least one balancing weight to or removing at least one balancing weight from the rotational body 12 at the standstill rotational speed S 130 in order to compensate the imbalance, then rotating the rotational body 12 about the axis of rotation R at the hardening rotational speed V 210, wherein the magnitude of the hardening rotational speed V is greater than the magnitude of the imbalance determination rotational speed U, preferably then further rotating of the rotational body 12 about the axis of rotation R at the imbalance determination rotational speed U 140, after the at least one balancing weight has been attached to or removed from the rotational body 12 130, in order to detect an imbalance in the rotational body 12, and preferably repeating the balancing if necessary.

Figure 8:
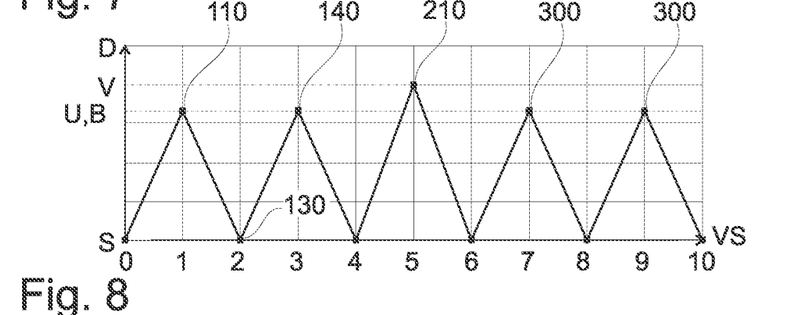

According to FIG. 8, a preferred sequence of method steps can be designed as follows: at the outset, rotating the rotational body 12 about its axis of rotation R at the imbalance determination rotational speed U 110 in order to detect an imbalance of the rotational body 12, then determining the imbalance of the rotational body 12 120, then fastening at least one balancing weight to or removing at least one balancing weight from the rotational body 12 at the standstill rotational speed S 130 in order to compensate the imbalance, preferably then further rotating of the rotational body 12 about the axis of rotation R at the imbalance determination rotational speed U 140, after the at least one balancing weight has been attached to or removed from the rotational body 12 130, in order to detect an imbalance in the rotational body 12, and preferably repeating the balancing if necessary, then rotating the rotational body 12 about the axis of rotation R at the hardening rotational speed V 210, preferably in the context of the final assembly of the rotational body 12, wherein the magnitude of the hardening rotational speed V is greater than the magnitude of the imbalance determination rotational speed U.

The hardening rotational speed V is, for example, between 16,000 and 22,000 revolutions per minute, inclusive. The hardening rotational speed V is preferably 20,000 revolutions per minute. A deviation of up to 10 percent can be provided in each case.

For example, the bursting rotational speed BD, independently of or also depending on the aforementioned values, can be between 23,000 and 27,000 revolutions per minute, inclusive. The bursting rotational speed BD is preferably 25,000 revolutions per minute, independently of or also depending on the aforementioned figures. A deviation of up to 10 percent can be provided in each case.

For example, the operating rotational speed B, independently of or also depending on the aforementioned values, can be between 400 and 1000 revolutions per minute, inclusive. The operating rotational speed B is preferably 500 revolutions per minute, independently of or also depending on the aforementioned figures. A deviation of up to 10 percent can be provided in each case.

For example, but not limited thereto, the imbalance determination rotational speed U can correspond to the operating rotational speed B, in particular with a deviation of 10 percent, inclusive.

A rotational body 12 adjusted according to the teachings of the disclosure can be operated at an operating rotation speed B in regular operating practice 300 without premature material failure due to the rotational hardening with its material thickness MS of the bridge arrangement 10 being small radially to the rotational axis R.

Regular operating practice 300 here means the daily use of the rotational body 12 in accordance with its actual purpose. This takes place according to FIGS. 5 to 8 according to the respectively preferred method.

LIST OF REFERENCE SIGNS

10 Bridge assembly of a rotational body
12 Rotational body
110 Rotating a rotational body about its axis of rotation with an imbalance determination rotational speed
120 Determining an imbalance of a rotational body
130 Fastening at least one balancing weight to or removing at least one balancing weight from a rotational body a standstill rotational speed
140 Further rotating of the rotational body about the axis of rotation at an imbalance determination rotational speed
210 Rotating a rotational body about its axis of rotation at a hardening rotational speed
300 Regular operating practice
R Axis of rotation
U Imbalance determination rotational speed
S Standstill rotational speed
V Hardening rotational speed
B Operating rotational speed
BD Bursting rotational speed
A Section of a bridge assembly of a rotational body designed as a rotor lamination
MS Material thickness
D Rotational speed
ÄPD Equivalent plastic strain
TS Transformed stress amplitude
SD Spin rotational speed
VS Method stages

The invention claimed is:

1. A method for hardening a bridge assembly of a rotational body having an axis of rotation for an electric drive, the method comprising the following steps for balancing and rotational hardening, the balancing comprising:
rotating the rotational body about the axis of rotation at an imbalance determination rotational speed in order to detect an imbalance of the rotational body;
determining the imbalance of the rotational body;
fastening at least one balancing weight to or removing at least one balancing weight from the rotational body at a standstill rotational speed in order to compensate the imbalance; and
the rotational hardening comprising:
rotating the rotational body about the axis of rotation at a hardening rotational speed, wherein a magnitude of the hardening rotational speed is greater than a magnitude of the imbalance determination rotational speed;
wherein the hardening rotational speed is set such that at least one bridge assembly of the rotational body has a strain measurement of at least 0.2 percent up to and including 1 percent after rotational hardening.

2. The method according to claim 1, wherein the rotational body is a rotor lamination, a rotor lamination stack, a rotor or an electric machine.

3. The method according to claim 2, wherein at least one bridge assembly is arranged on an outer circumference of at least one rotor lamination.

4. The method according to claim 1, further comprising:
further rotating of the rotational body about the axis of rotation at the imbalance determination rotational speed after the at least one balancing weight has been attached to or removed from the rotational body, in order to detect an imbalance in the rotational body, and if required repeating the balancing.

5. The method according to claim 1, further comprising the following sequence of steps:
initially rotating the rotational body about the axis of rotation at the hardening rotational speed wherein the magnitude of the hardening rotational speed is greater than the magnitude of the imbalance determination rotational speed;
then rotating the rotational body about axis of rotation at the imbalance determination rotational speed in order to detect the imbalance of the rotational body, wherein, between rotating the rotational body about the axis of rotation at the hardening rotational speed and rotating the rotational body about the axis of rotation at the imbalance determination rotational speed, the rotational body is stationary at the standstill rotational speed;
then determining the imbalance of the rotational body; and
then fastening the at least one balancing weight to or removing the at least one balancing weight from the rotational body at the standstill rotational speed in order to compensate the imbalance.

6. The method according to claim 5, further comprising then further rotating of the rotational body about the axis of rotation at the imbalance determination rotational speed after the at least one balancing weight has been attached to or removed from the rotational body, in order to detect an imbalance in the rotational body, and if necessary repeating the balancing.

7. The method according to claim 1, further comprising the following sequence of steps:
initially rotating the rotational body about the axis of rotation at the imbalance determination rotational speed in order to detect the imbalance of the rotational body;
then determining the imbalance of the rotational body;
then fastening the at least one balancing weight to or removing the at least one balancing weight from the rotational body at the standstill rotational speed in order to compensate the imbalance; and then rotating the rotational body about the axis of rotation at the hardening rotational speed, wherein the magnitude of the hardening rotational speed is greater than the magnitude of the imbalance determination rotational speed.

8. The method according to claim 7, further comprising then further rotating of the rotational body about the axis of rotation at the imbalance determination rotational speed after the at least one balancing weight has been attached to or removed from the rotational body, in order to detect an imbalance in the rotational body, and if necessary repeating the balancing.

9. The method according to claim 7, further comprising, before the hardening at the hardening rotational speed, further rotating of the rotational body about the axis of rotation at the imbalance determination rotational speed, after the at least one balancing weight has been attached to or removed from the rotational body, in order to detect an imbalance in the rotational body, and if necessary repeating the balancing.

10. The method according to claim 7, wherein the rotating of the rotational body about the axis of rotation at the hardening rotational speed is done for a final assembly of the rotational body.

11. A method for hardening a bridge assembly of a rotational body having an axis of rotation for an electric drive, the method comprising the following steps:
- for balancing, rotating the rotational body about the axis of rotation at an imbalance determination rotational speed in order to detect an imbalance of the rotational body;
- determining the imbalance of the rotational body; and fastening at least one balancing weight to or removing weight from the rotational body at a standstill rotational speed in order to compensate the imbalance; and
- for rotational hardening, rotating the rotational body about the axis of rotation at a hardening rotational speed, wherein a magnitude of the hardening rotational speed is greater than a magnitude of the imbalance determination rotational speed;
- wherein the hardening rotational speed is set such that the bridge assembly of the rotational body has a strain measurement of at least 0.2 percent up to and including 1 percent after rotational hardening.

12. The method according to claim 11, wherein the rotational body is a rotor lamination, a rotor lamination stack, a rotor or an electric machine.

13. The method according to claim 12, wherein the bridge assembly is arranged on an outer circumference of at least one rotor lamination.

* * * * *